(12) United States Patent
Van Dis et al.

(10) Patent No.: US 12,234,034 B2
(45) Date of Patent: Feb. 25, 2025

(54) AIRCRAFT OPENING PLUG AND INSTALLATION TOOL

(71) Applicant: SERIAS-LEE, LLC, Washington, NC (US)

(72) Inventors: James Hodges Van Dis, Washington, NC (US); Ralph Samuel Jarvis, Jr., Bath, NC (US)

(73) Assignee: SERIAS-LEE, LLC, Washington, NC (US)

( * ) Notice: Subject to any disclaimer, the term of this patent is extended or adjusted under 35 U.S.C. 154(b) by 808 days.

(21) Appl. No.: 17/362,384

(22) Filed: Jun. 29, 2021

(65) Prior Publication Data

US 2022/0411099 A1 Dec. 29, 2022

(51) Int. Cl.
*B64F 1/00* (2024.01)
*C09K 21/14* (2006.01)

(52) U.S. Cl.
CPC .............. *B64F 1/005* (2013.01); *C09K 21/14* (2013.01)

(58) Field of Classification Search
CPC ................................ B64F 1/005; C09K 21/14
See application file for complete search history.

(56) References Cited

U.S. PATENT DOCUMENTS

| | | | | |
|---|---|---|---|---|
| 3,646,980 A | * | 3/1972 | Peterson | B64F 1/005 244/129.4 |
| 4,615,460 A | | 10/1986 | Buccellato et al. | |
| 7,533,698 B2 | * | 5/2009 | Nolfi | F04D 29/701 138/104 |
| 7,891,129 B2 | * | 2/2011 | Parry, Jr. | F41A 35/02 42/96 |
| 8,708,416 B2 | * | 4/2014 | Stronconi | A47C 7/383 297/397 |
| 11,110,308 B1 | * | 9/2021 | Paulin | A62C 2/065 |
| 2004/0195437 A1 | * | 10/2004 | Garric | B64F 1/005 244/53 B |
| 2007/0022537 A1 | * | 2/2007 | Faustick | A47D 13/08 128/845 |
| 2008/0248234 A1 | | 10/2008 | Walters et al. | |
| 2015/0089879 A1 | | 4/2015 | Sparks et al. | |

FOREIGN PATENT DOCUMENTS

EP 0942107 A2 * 9/1999 ............... E04B 1/94

OTHER PUBLICATIONS

Translation of EP 0 942 107 provided by Espacenet. (Year: 2024).*

* cited by examiner

*Primary Examiner* — James N Smalley
(74) *Attorney, Agent, or Firm* — Russell D. Nugent (57) ABSTRACT

A cover for an opening on the exterior of an aircraft that contains a fire-resistant, high-temperature tolerant foam encased in a cover made of an aramid fabric. The cover is friction-fitted to the interior of the orifice. The cover can contain one or more durable rings embedded in the fire-resistant, high-temperature tolerant foam meant to protrude outward from the rest of the cover of the body to contact an interior of the orifice into which they are inserted holding the cover in place with friction instead of fasteners.

11 Claims, 7 Drawing Sheets

AIRCRAFT OPENING PLUG AND INSTALLATION TOOL

BACKGROUND OF THE INVENTION (a) Field of the Invention

The present invention is in the technical field of ground support and accessories for aircraft. More particularly, the present invention is in the technical field of covers or plugs used to protect sensitive aircraft equipment.

(b) Background Art

Modern aircraft necessarily have several sensitive components that need to be protected when the aircraft is being stored or maintained including, but not limited to engine intakes, auxiliary power units, oil coolers, exhaust ports, cowls, vents and air inlets. Plugs or covers have been traditionally used to close or cover openings that are featured by such parts of the aircraft. Each of these components is accessed via a port, opening or orifice featured by the aircraft that needs to be protected by some form of cover or plug when the aircraft is on the ground and not in use. For example, these plugs and covers are used to protect sensitive components from weather, debris and even animals interested in exploring or taking up residence in these openings. Failure to protect the openings associated with sensitive components can lead to significant and disabling damage to the aircraft.

Traditionally these covers are made of a vinyl material stuffed with a single block of sculpted temperature intolerant foam. Some of these plugs even feature a zipper or other means to open the cover and remove the foam. Other covers feature streamers that can attach the cover to the outside of the aircraft or another nearby cover. These streamers help prevent the cover from falling into the opening into which it is inserted such that it cannot be easily seen. Numerous aircraft have been damaged as a result of failure to remove these covers from the aircraft prior to takeoff. The current configuration of these devices is apt to cause as many problems as they are supposed to solve.

For example, the materials currently used to make these plugs and covers are not heat resistant enough to be installed when the aircraft is still hot. As discussed above, traditional covers include a temperature intolerant plug inserted into a vinyl cover. In addition, traditional covers and plugs have exteriors that are made of vinyl, nylon, temperature intolerant plastic, rubber and other materials that are not capable of sustaining the high temperatures needed to install these covers and plugs on an aircraft immediately after landing. Rather, support crews have to wait for a period of time for the engine to cool to install the covers leading to undesired delay.

Moreover, some of these devices feature components made of hardened materials on the outside or near the outer covering of the device. For example, some covers have a zipper that allows the user to remove the inner core of the cover. Zippers and other structures meant to attach the covers to the aircraft can come into contact with and damage the inner surfaces of the equipment into which they are inserted.

Furthermore, the fasteners that are used with traditional covers are typically not compatible with the corrosive cleaning agents used to clean aircraft. Such fasteners are also subject to corrosion from being exposed to the elements. Fasteners that fail to fasten can lead to the covers coming out of or off of the aircraft when they should not and they can allow the plug or cover to fall into the opening which it is supposed to protect as discussed above.

Additionally, the portions of the aircraft protected by these covers or plugs are oftentimes located far off the ground requiring ground crews to use ladders and the like to reach the portions of the aircraft on which these devices are used. This makes the use of these devices more cumbersome and more likely to lead to people being injured.

An object of the present invention is to provide a device to cover or plug an opening on an aircraft securely without the use of fasteners, zippers or other hardware that could damage the aircraft or require attachment to the inside or outside of the aircraft.

Another object of the present invention is to provide an aircraft opening cover or plug that is heat resistant enough to be placed into or onto the aircraft immediately after landing and shutting down the engine.

Another object of the present invention is to provide an aircraft opening plug that can be inserted into an opening featured by an aircraft securely via a compression fit rather than being attached to a portion of the aircraft.

Another object of the present invention is to provide an aircraft plug or cover that can be installed using a tool that can be operated from the ground.

These and other advantages of the inventive aircraft plug or cover will become apparent based upon the foregoing disclosure.

BRIEF SUMMARY OF THE INVENTION

The present invention is an aircraft plug or cover that is configured to fit into an orifice, cavity or equipment opening on an aircraft and is securely held in place by friction rather than traditional fasteners. More specifically, some embodiments of the inventive plug feature one or more rings encased in a heat resistant foam and that are sized and positioned, i.e. configured, to fit into a specific opening featured by an aircraft. The rings embedded inside the foam are shaped and sized to cause the exterior of the device to contact the interior of the aircraft cavity. This configuration ensures that the outer covering of the device is in contact with the interior of the orifice such that there is a compression or friction fit between the plug and the aircraft. As discussed above, most conventional covers use fasteners to secure them in place inside the appropriate space. The Inventors have determined that a compression fit can not only provide the necessary force to hold the plug in place but eliminates the need for hard fasteners on the exterior of the plug. The inner workings of the aircraft are thereby protected from the durable rings embedded inside the foam interior of the device so there is no chance that those rings will damage the interior of the aircraft cavity. The outer covering of the device is made with a material that is both heat resistant, durable and soft enough to securely occupy the cavity associated with a structure such as an auxiliary power unit inlet/outlet without damaging the interior of the cavity.

The device requires no hardware or fasteners to secure it to any portion of the aircraft. Rather the body of the plug itself extends outward to allow at least a portion of the device to physically contact the inside of the orifice into which it has been inserted. The plugs or covers are specifically shaped to accommodate the interiors of their respective orifices such that the plugs are secure within the space they occupy but are not difficult to remove. Those embodiments that feature rings have rings sized and shaped to contact at least a portion of the inside of the aircraft orifice to hold the device in place, even if the entire body of the device does not contact the interior of the orifice.

In some embodiments, the rings within a single plug are not the same size in that the ring that inserts most deeply into the orifice is smaller in diameter than the one that positioned near the opposing end of the device. The smaller ring is inserted into the orifice first such that it comes into contact with the inner surface of the orifice into which it is inserted. The larger ring is just large enough to prevent it from fitting entirely into the orifice of the aircraft. The larger ring contacts at least a portion of the mouth of the orifice and in conjunction with the smaller ring, the device is held in place by friction. The size of the larger ring prevents the device from being inserted so far into the orifice that it is lost or is simply not visible to the operator on the ground. In some embodiments, the rings are positioned inside the plug such that they are parallel, i.e. each point on one ring is equidistant from a corresponding point on the other ring. In other embodiments, the rings are not parallel with each other, but one ring will be positioned such that it leans toward or away from the other ring.

The inventive plug or cover features an exterior that is made of an aramid fabric that does not scratch or damage the surface of the aircraft into which it comes into contact. Aramid fibers in general are nonconductive, do not melt or burn in normal oxygen levels, and are known to be non-abrasive. As mentioned above, prior art covers and plugs are made of vinyl, nylon, temperature intolerant plastic, rubber or a similar, cheap to produce material. However, these materials are not breathable. They are specifically designed to prevent moisture from passing in either direction and as a result not only do they keep water out of the orifice, they trap moisture inside of it. As a result, these materials can contribute to the corrosion of the inner workings of the aircraft orifice. The inventive plug or cover; however, utilizes an aramid fabric that is not only breathable and thereby allows moisture to leave the orifice, but still works to keep moisture and debris out of the same place.

The interior of the plug is made of a flame retardant, high temperature tolerant foam that is shaped to fit into the desired aircraft opening. Preferred embodiments of the foam are made of polyurethane or silicone foam. Specifically, the plug is shaped to fit an interior of an orifice of an aircraft such that a portion of an exterior of the plug contacts a portion of the interior of the orifice thereby holding the plug in place via friction The temperature tolerance of the materials used will not only allow the plug to be used in an aircraft that has not cooled off after use, but will prevent damage to the internal components of an aircraft in that the plug will not melt in place if like prior art devices will when placed in a hot aircraft opening. Some embodiments will have a body that features flared portions that extend outward and away from the rest of the plug body. These flared portions can be used in embodiments that have rings and in those that do not. They are included to provide a surface on the plug that will contact the interior surface of the aircraft opening and to allow the plug to become secured in place when properly positioned within the aircraft. As described above, whether the plug uses internal rings, flared portions of the body or both, the plug is meant to insert into the opening and be held in place via friction resulting from its shape and the unique outer covering.

Some embodiments of the plug or cover feature one or more loops on the exterior of the plug or cover that can be used for installation. In preferred embodiments, the loops featured by the cover or plug are made of high strength aramid material and are integrated into the rest of the plug or cover to ensure any force exerted on them during removal is transmitted evenly across the body of the plug or cover to ensure complete removal without damaging the aircraft or plug/cover.

Some embodiments feature one or more stanchions inserted into the foam body of the plug to provide additional support for the plug. This extra support helps the plug maintain its shape which can be important for proper fit but also for proper insertion and removal of the plug. If the plug body is deformed or sags in any way, it may well increase the chances the plug damages the interior of the aircraft opening when it is inserted or removed.

Some embodiments of the inventive aircraft plug feature one or more end plates to which the stanchions are connected at either end. In preferred embodiments, the end plates are made of aluminum or a comparable material. The end plate that is closest to the front of the plug, i.e. the portion of the plug that faces the exterior of the aircraft when it is inserted, can feature a receiver for the installation pole that the inventors have created to be used with the inventive plugs. The receiver is a protrusion that is shaped to be complementary to the end of the installation pole. Preferred embodiments of the receiver include a piece of tubing with a rectangular, cuboid or square cross section, extending away from the front of the cover and that is complementary to a hollow rectangular, cuboid or square cylinder that is positioned at the end of the installation pole. In preferred embodiments, the tubing featured by the install pole receiver is a solid durable structure made of aluminum or a comparable material. In use, the user places the end of the installation pole over the tubing to engage an end of the cover. The user can then lift the cover out of the aircraft opening into which it was inserted.

Those embodiments that do not include stanchions may be made foldable or collapsible by the removal of most or all of the fire-retardant foam that is inside the plug. In preferred embodiments of the engine plug is collapsible as it is made with a hollow interior.

The materials used to make these inventive covers are resistant to chemicals and acids present in the cleaning solutions used to clean aircraft and, as a result, the covers or plugs do not have to be removed prior to cleaning the exterior of the aircraft. This disclosure details specific plugs designed for specific aircraft, but the teachings of this disclosure can be used to adapt the plug for any aircraft opening.

DETAILED DESCRIPTION OF THE INVENTION

Figure 1A:
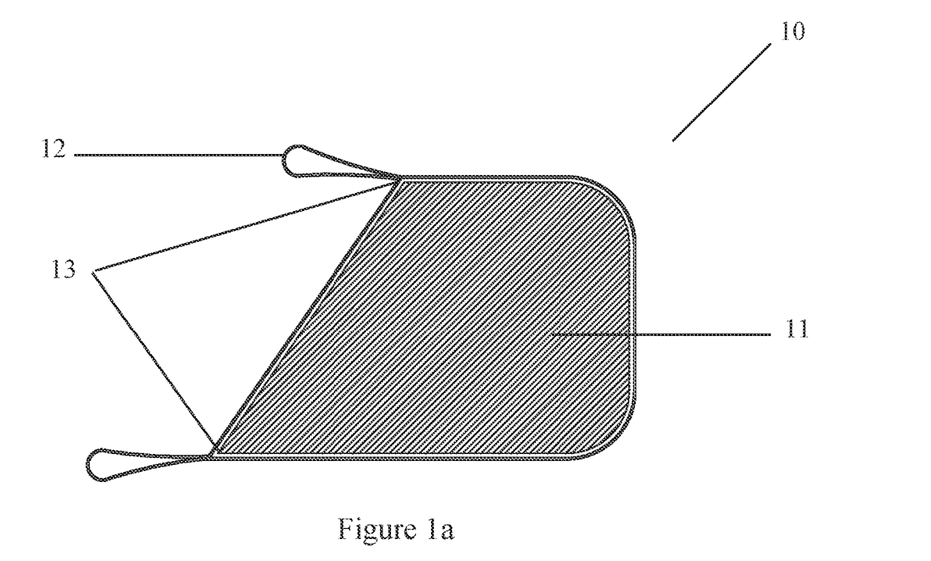
FIG. 1A is a cross-sectional view of a preferred embodiment of the Auxiliary Power Unit exhaust plug.
Figure 1B:
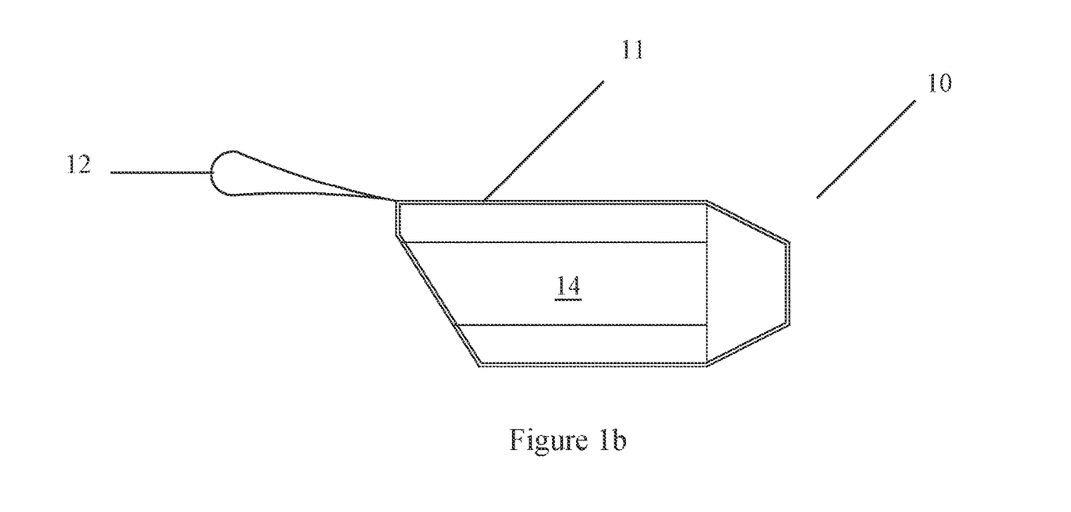
FIG. 1B is a side view of a preferred embodiment of the Auxiliary Power Unit exhaust plug.

FIG. 1a shows a first embodiment of the inventive aircraft plug or cover 10 configured to be used to cover or plug the opening in the exterior of the aircraft for an auxiliary power unit (APU). This embodiment demonstrates some of the unique features of the inventive plugs created by the inventors. First, there is an outer covering 11 covering the exterior of the plug 10 which is made of an aramid fabric. As discussed above, aramid fabrics, despite the difficulty and expense of manufacture, are superior to other materials for the outer covering of such a device because they are highly temperature resistant, non-melting, non-abrasive and breathable. The outer covering 11 also features one or more loops 12 that can be used to remove the device from an aircraft after installation using a tool that will be discussed below. While a skilled artisan can appreciate the location of the loops 12 can be varied for convenience or design, this particular embodiment features two loops 12 located on the exterior of what is meant to be the front of the plug 10, i.e. the surface that is facing the environment outside of the aircraft. Preferred embodiments of the loop(s) 12 are made of woven aramid material. In addition, as can be seen in FIG. 1b, the loops 12 are integrated into the outer covering 11 such that when force is applied to the loop(s) 12, it is applied to the entire outer covering 11 of the plug 10. The body 13 of the plug is filled with a fire-resistant, high-temperature tolerant foam 14 that is shaped to conform to the interior of the orifice or opening the plug 10 is meant to protect. The shape of the plug 10 as dictated by the space into which it is inserted as the plug 10 is sized and shaped to fit tightly into the opening, in this case leading to the APU. The outer covering 11, made of an aramid material, allows the plug 10 to contact the interior of the space it is designed to protect such that it stays in place by friction, but is still removable with the appropriate level of force.

This embodiment has a body that is uniform—the foam 14 in the body 13 of the plug 10 is shaped such that the exterior covering 11 of the plug 10 contacts the interior of the aircraft opening into which it is inserted along most or the entire length of the plug. As will be seen below, other plugs are shaped such that only a small portion of the exterior cover 11 of the plug 10 contacts the interior of the aircraft opening or orifice.

FIG. 1b shows a similar embodiment of the plug 10—this one designed to fit the Auxiliary Power Unit Oil Cooling Air Inlet for an engine. As above, the plug 10 has a foam body 14 and a cover 11 made of an aramid material as well as a loop 12 also made of an aramid material and attached to the front end of the plug 10.

Figure 2A:
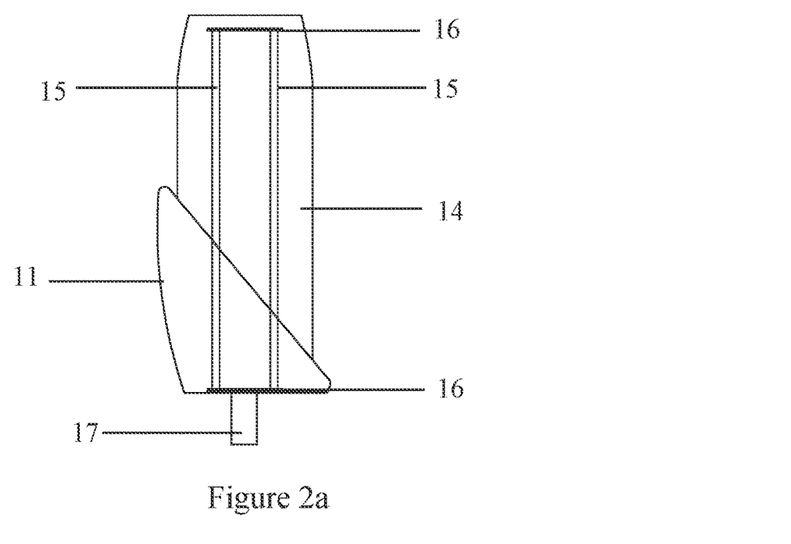
FIG. 2A is a partial cross-sectional view of a preferred embodiment of an FOD ejection port plug.
Figure 2B:
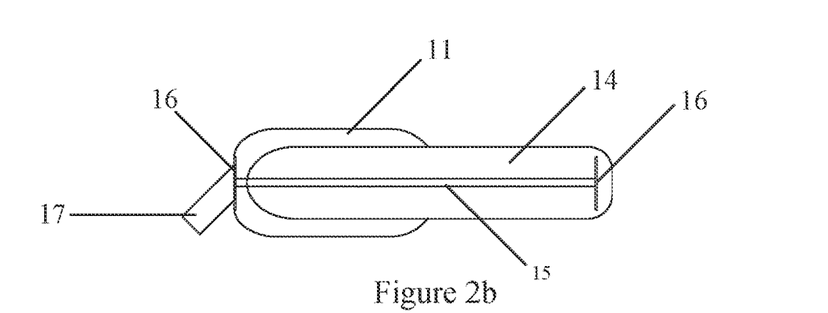
FIG. 2B a cross-sectional view thereof.

FIGS. 2a and 2b show an FOD ejection port plug designed to plug the FOD ejection port of an engine. FIG. 2a shows a partial cross-sectional view of a second embodiment of the plug 10 as viewed from above. FIG. 2b shows a fully cross-sectional view of the plug 10 viewed from the side. This embodiment of the inventive plug 10 is meant to be inserted into a relatively linear tube-shaped opening or orifice. It features an outer covering 11 made of an aramid fabric as was used with the first embodiment described above. The outer covering 11 extends over all or the majority of the exterior surface of the body 13 of the plug 10. This covering 11 is shown as partially cut away in FIG. 2a to show the inside of the plug 10. The inside of the plug 10 is filled with a fire-resistant foam 14, such as polyurethane or silicone foam, that is capable of sustaining high temperatures. The foam 14 is shaped to conform to the interior of the orifice into which it is inserted so that all or a portion of the outer covering 11 is in contact with the interior of the opening once the plug 10 is inserted therein. This embodiment of the plug 10 also features stanchions 15 extending through the body of the plug 10. The stanchions 15 in this embodiment are embedded inside the foam of the plug 10 and make the body 13 more rigid.

This not only provides a better fit between the plug 10 and the orifice into which it is inserted but the rigidity of the plug body 13 makes it easier to remove as will be described below. FIG. 2a shows that there are two aluminum stanchions embedded into this FOD Ejection Port plug 10. The stanchions 15 run side by side through the foam 14 and extend from a front end of the plug 10 to a rear of the plug 10. The front of the plug 10 is meant to be facing the exterior of the aircraft once the plug 10 is inserted. At either end of the stanchions 15, the stanchions are in contact with an end plate 16 that helps to hold the stanchions 15 in place and to add rigidity to the body 13 of the plug 10.

Figure 2C:
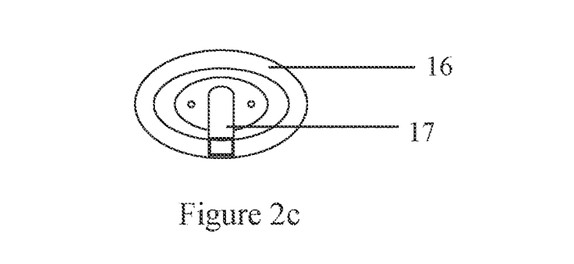
FIG. 2C is a front view of the install pole receiver of the FOD ejection port cover.

FIG. 2c shows a front view of the same plug 10. The front of the plug 10 features an install pole receiver 17 which in this embodiment is an extension that protrudes from the front surface of the plug 10. The shape of the protrusion 17 can be varied, but it is designed to interact with a tool that will be described below. To that end, preferred embodiments of the protrusion will be shaped like a square prism, cube, cuboid, or rectangular prism structure. The shape of the structure allows it to be manipulated by the tool.

Figure 3A:
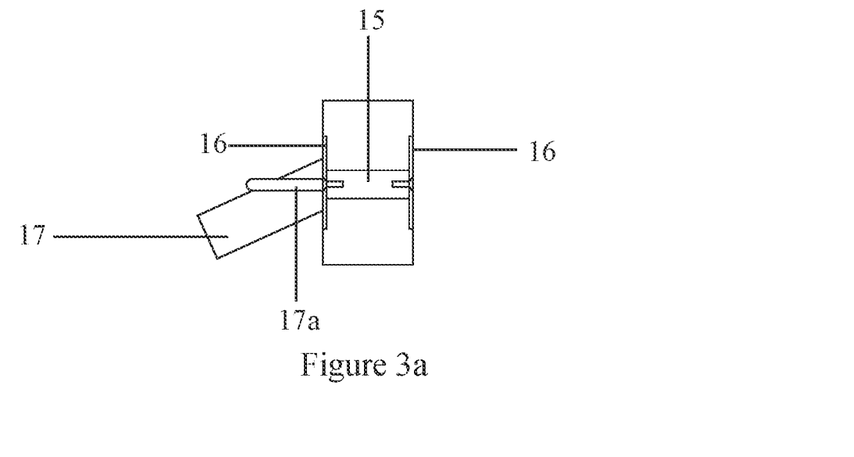
FIG. 3A is a cross-sectional view of a preferred embodiment of an oil cooler plug.
Figure 3B:
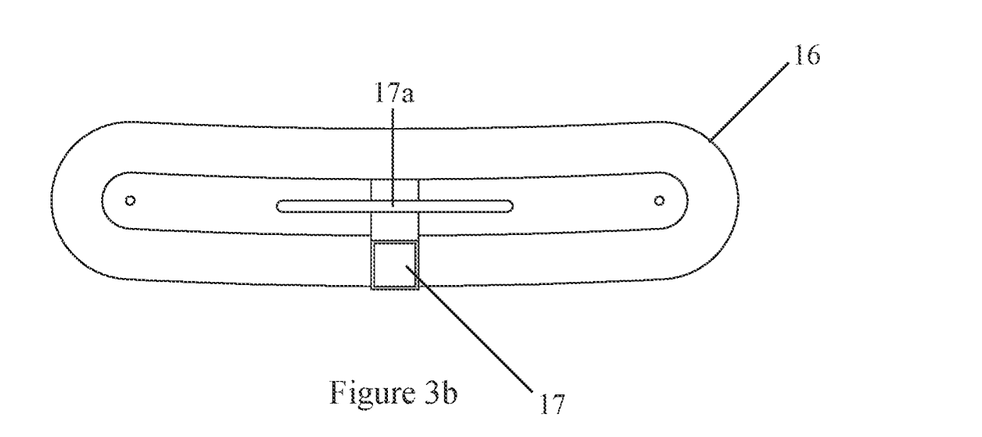
FIG. 3B is a front view thereof.

Similarly, FIGS. 3a and 3b show an Oil Cooler plug for an engine featuring one or more aluminum stanchions embedded in the foam body 14 of the plug 10. At opposing ends of each stanchion there is located an end plate 16. The end plate 16 that is located closest to the front of the plug 10, features an install pole receiver 17 similar to that described above. The stanchions 15 are connected to end plates 16 at either end; as a result, when the user pulls on one end of the plug 10, the stanchions 15 transmit the force exerted on the plug 10 throughout the plug 10. This embodiment of the plug also features a lateral bar 17a that provides additional support to the front of the plug 10 during installation and removal.

Figure 4A:
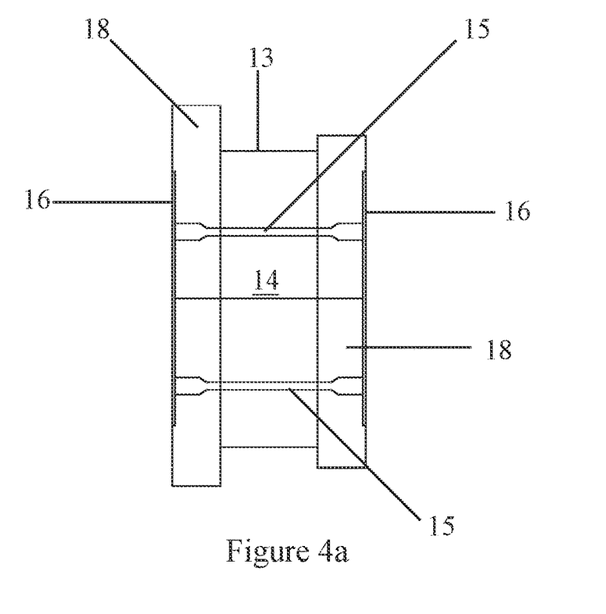
FIG. 4A is a cross-sectional view of the Engine Air Inlet Plug.
Figure 4B:
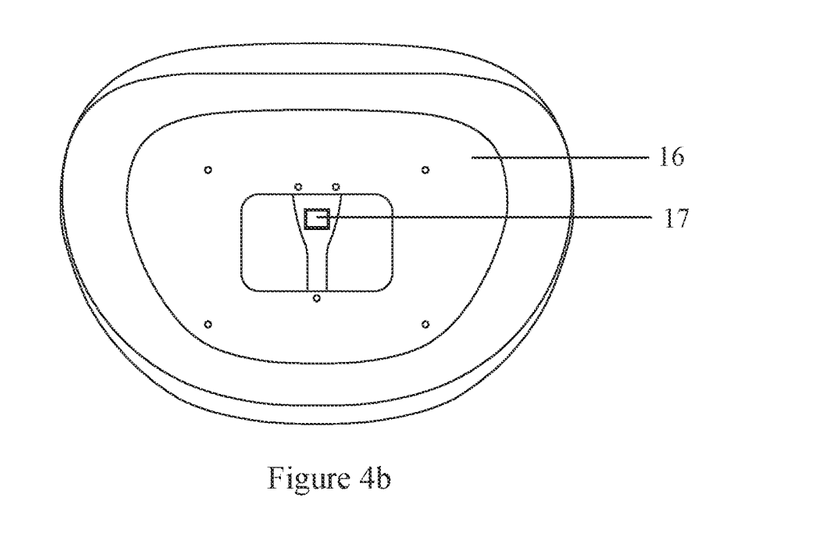
FIG. 4B is a front view thereof.

The embodiment shown in FIGS. 4a and 4b is an Engine Air Inlet Plug. This plug 10 has features very similar to those described above including a cover 11 made of an aramid material that covers all or a majority of the outer surface of the plug 10 that allows moisture to leave the plug 10 but not to enter. The plug 10 also features stanchions 15 embedded in a foam 14 body 13 of the plug 10 and connected at one or both ends to end plates 16, in this case made out of aluminum. One of the aluminum end plates 16 in this plug 10 is visible from the outside of the front of the plug 10 and forms a reinforced area around the install pole receiver 17. The receiver 17 is attached to and extends outward and away from the end plate 16 visible from the front of the plug 10. In addition, the body 13 of the plug 10 has an expanded or flared portion 18 that is adjacent to front of the plug, i.e. the body 13 is wider in diameter at one end of the plug 10 to allow it to occupy the space presented by the opening in the aircraft. This flared portion 18 allows the plug 10 to be inserted into a cavity such that the sides of the flared portion 18 of the plug 10 contact the interior of the cavity, firmly seating the plug 10 within the entrance to the cavity. This flared portion 18 can be sized to prevent the plug 10 from being fully inserted into the orifice thereby preventing it from falling into the orifice and becoming "lost." This plug 10 also features the install pole receiver 17 featured by the other embodiments.

Figure 5A:
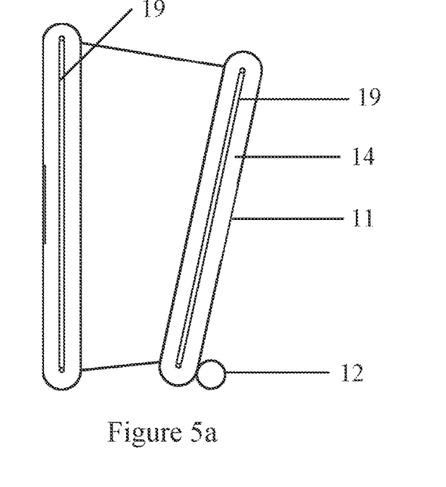
FIG. 5A is a side view of the engine exhaust plug.
Figure 5B:
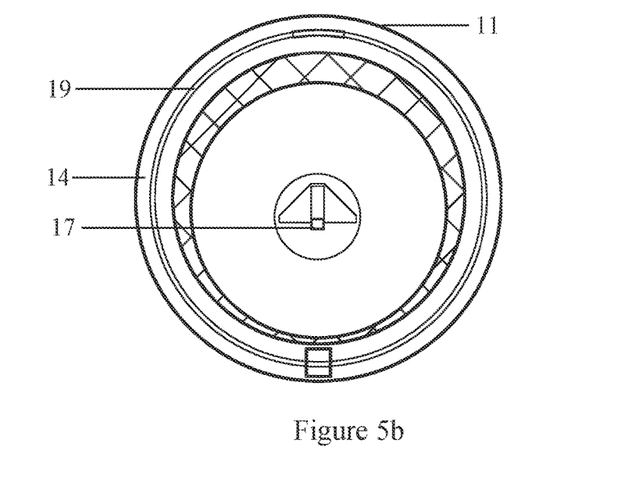
FIG. 5B is a front view thereof.
Figure 5C:
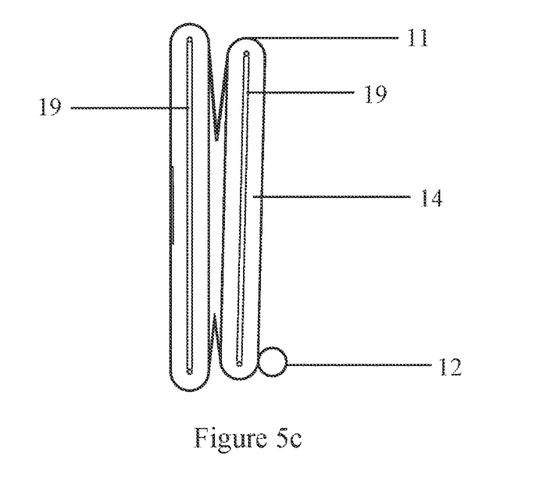
FIG. 5C is a side view of the engine exhaust plug in a compressed or collapsed state.

FIGS. 5a, 5b and 5c show an additional embodiment of the plug, in this case designed to fit into the Engine Exhaust Port of an engine. The embodiment shown in FIGS. 5a, 5b and 5c features two rings 19 made from a durable, high temperature resistant material. These rings 19 are embedded in a heat resistant foam 14 such as fire rated foam that is sculpted to fit the internal shape of the orifice into which the plug 10 is configured to fit. The rings 19 provide a solid, durable structure that provides support to the body 13 of the plug 10 and causes the diameter of the plug 10 surrounding the ring to be greater than other portions of the body 13 of the plug 10. This allows the body 13 of the plug 10 to flare outward in certain places to contact the inside surface of the orifice into which the plug 10 is inserted. In this embodiment, the two rings 19 are different diameters and are not positioned such that they are completely parallel to each other, i.e. the second ring 19 has a smaller diameter than the first ring 12 or vice versa. In addition, the rings 12 are not parallel, i.e. not every point on the second ring 19 is equidistant from corresponding points on the first ring 19. As a result, not every portion of the second, smaller ring 19 is the same distance away from the corresponding portion of the first ring 19. In other words, one ring 19 is "titled" at an angle to the other causing portions of the second, smaller ring 19 to be positioned closer to portions of the larger, first ring 19, when the device is fully constructed. This configuration helps keep the plug 10 from falling too far into the orifice into which it is inserted. The larger ring 19 has a diameter that is too large to allow that portion of the device to fit as deeply into the cavity as the second ring is inserted and thereby prevents the device from falling further into the cavity than was intended and becoming lost. In some embodiments, the first ring 19 has a diameter that is larger than the opening of the orifice into which it is to be inserted. The rings 19 are embedded in the foam 14 and, as a result, they do not directly contact any portion of the aircraft and therefore, do not have the potential to damage the interior of the cavity in which they are positioned. The embodiment shown in FIGS. 5a through 5c also features one loop 12 attached to the front of the plug 13 that would allow someone to use a tool to engage the loop 12 and pull the plug 10 out of the orifice. Preferred embodiments feature loops 12 made of braided aramid fabric. Preferred embodiments of the plug featuring the loop 12 have loops 12 that do not simply attach to an end of the plug, but rather form or are integrated with the outer covering 11 of the device. This configuration ensures that any force applied to the loop 12 is transmitted throughout the body of the plug 10 rather than just being centered on the front of the plug 10 thus allowing for easier removal of the plug 10 and reduced chances of the plug deforming after long periods of use.

Figure 6:
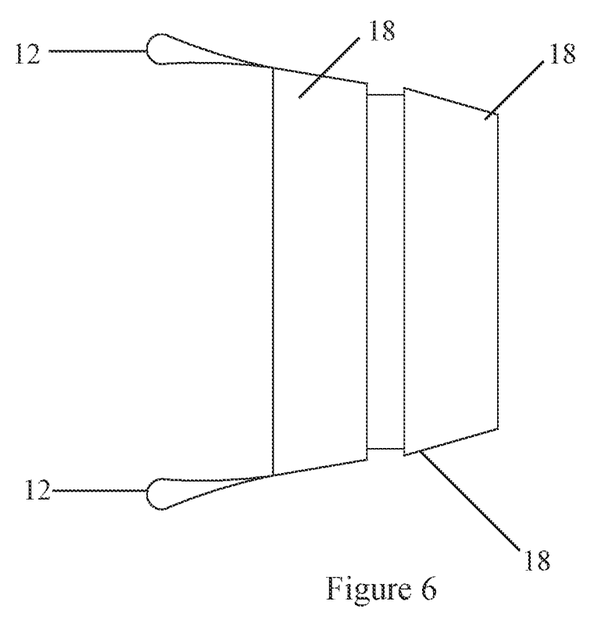
FIG. 6 is a side view of an AC vent plug.

FIG. 6 shows an AC vent plug which shares some of the same features as the plug for the Engine Exhaust Port of an engine. This plug 10 features a foam body 14 that is shaped to form two flared, ring-like structures 18 that protrude outward away from the rest of the plug 10 to contact the interior surface of an opening in the aircraft. As discussed above, the flared portions 18 of the plug 10 contact the interior surface of the opening of the aircraft causing it to be held in place via friction between the outer covering 11 of the plug 10 and the interior of the aircraft.

Figure 7:
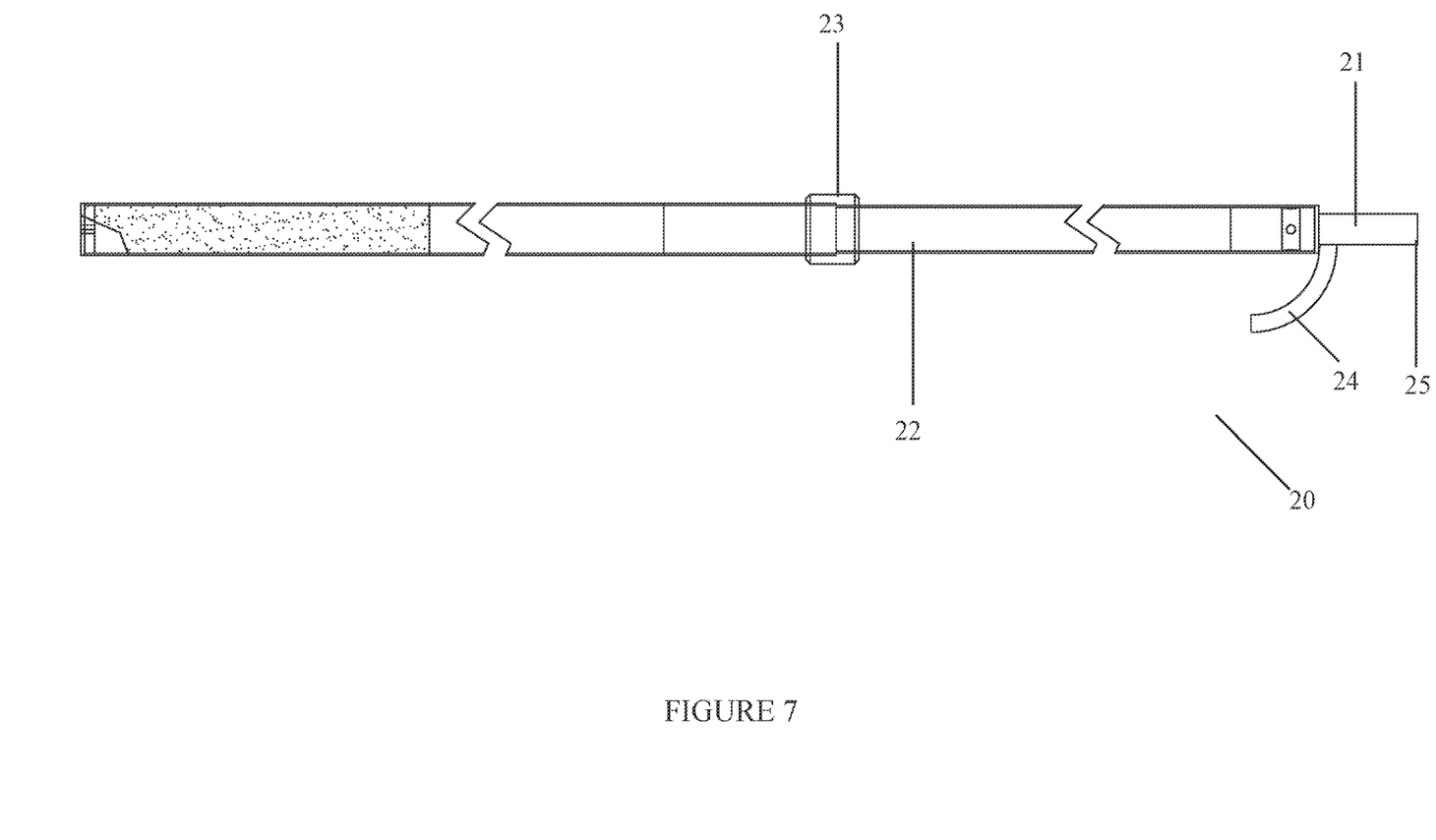
FIG. 7 is a cross sectional view of the installation pole.

FIG. 7 is a side view of the tool 20 that the inventors have designed to engage the install pole receiver 17 featured by most of the embodiments of the plug 10. The tool 20 is a pole that features an installation end 21 including a hollow, cylinder 25 protruding from the end of the tool 20 that is shaped to fit over and engage with the outer surface of the pole receiver 17 on the plug 10. In preferred embodiments, the installation end features a hollow rectangular, cuboid or square cylinder 25 that fits over the complementarily shaped pole receiver 17. In some embodiments of the plug, the install pole receiver is angled downward to make it easier to fit the installation end 21 of the pole 20 over the receiver 17. The installation end 21 also features a removal hook 24 which in preferred embodiments is a curved structure that can be inserted into a loop 12 to pull the plug 10 free of an orifice. The tool 20 includes a telescoping tube 22 with an internal stop (not shown) that prevents it from being pulled out of the rest of the tool 20. There is a locking ring 23 that locks the telescoping tube 22 in place when turned and tightened.

In use, the operator loosens the locking ring 23, extends the tube 22 to the desired length and then either uses the removal hook 24 to grasp a loop 12 featured on the exterior of the plug 10 or inserts the installation end 21 over the receiver 17. The pole receiver 17 is an inflexible tube attached to the plug and extending outward and away from it. The operator can insert cylinder 25 at the installation end 21 of the tool 20 over the surface of the pole receiver 17. Once the cylinder 25 is positioned over the receiver 17, the operator can twist the tool or rotate it slightly around is longitudinal axis to create tension between the receiver 17 and the cylinder 25 in the installation end 21 to "grip" the plug 10 by the pole receiver 17 tightly enough to pull it out of the orifice into which it was inserted.

The advantages of the present invention include, without limitation, the ability to block, cover or plug an opening in an aircraft body without risking damage to the delicate inner surface of the same opening. In addition, the materials out of which the plug are made are fire resistant enough that they can be put in place on an aircraft that has not yet cooled off without melting or deforming under the heat. Another advantage of the disclosed plug and tool is that it can be installed and removed from the aircraft by a crewmember standing on the ground. The plug is also resistant to the cleaning agents that are typically used to clean the exteriors of aircraft allowing them to be left in place during cleaning.

Reference throughout the specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout the specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

It is understood that the above described embodiments are only illustrative of the application of the principles of the present invention. The present invention may be embodied in other specific forms without departing from its spirit or essential characteristics. The described embodiment, including the best mode, is to be considered in all respects only as illustrative and not restrictive. The scope of the invention is, therefore, indicated by the appended claims, if any, in conjunction with the foregoing description.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A plug for protecting sensitive aircraft equipment comprising:
    a fire-resistant foam shaped to fit an interior of an orifice of an aircraft such that a portion of an exterior of the plug contacts a portion of the interior of the orifice thereby holding the plug in place via friction,
    a temperature resistant fabric covering an exterior of the fire-resistant foam,
    a first ring inserted into the fire-resistant foam, and
    a second ring inserted into the fire-resistant foam, wherein the first ring and the second ring are not parallel to each other.

2. The plug of Claim 1 wherein the second ring has a diameter that is smaller than the first ring.

3. The plug of Claim 1 wherein one of the first and second ring inserted into the fire-resistant foam has a diameter larger than the diameter of an opening of the aircraft orifice.

4. The plug of Claim 3 wherein the other of the first and second ring has a diameter that is smaller than the first one of the first and second ring.

5. The plug of claim 4 wherein the fire-resistant foam forming a body of the plug comprises a flared portion.

6. The plug of claim 1 wherein the fire-resistant foam forming a body of the plug further comprises a flared portion.

7. The plug of claim 6 wherein one of the first and second ring inserted into the fire-resistant foam has a diameter larger than the diameter of an opening of the aircraft orifice.

8. The plug of claim 1 further comprising a receiver that is a protrusion that is complementary to an end of an installation tool.

9. The plug of claim 5 further comprising a receiver that is a protrusion that is complementary to an end of an installation tool.

10. The plug of claim 7 further comprising a receiver that is a protrusion that is complementary to an end of an installation tool.

11. The plug of claim 1 wherein the temperature resistant fabric comprises an aramid fabric.

* * * * *